US010542106B2

(12) United States Patent
Kapadia et al.

(10) Patent No.: US 10,542,106 B2
(45) Date of Patent: Jan. 21, 2020

(54) CONTENT PRE-RENDER AND PRE-FETCH TECHNIQUES

(71) Applicant: MICROSOFT TECHNOLOGY LICENSING, LLC, Redmond, WA (US)

(72) Inventors: Ritika Kapadia, Newcastle, WA (US); Venkatraman V. Kudallur, Redmond, WA (US); Aniket A. Patankar, Redmond, WA (US); Tyler M. Barton, Seattle, WA (US); Shawn E. Pickett, Sammamish, WA (US); Nomita Paul, Redmond, WA (US); James R. Wordelman, Snoqualmie, WA (US); Qiaolin Mao, Kirkland, WA (US); Yan Ke, Redmond, WA (US); Hao Hu, Bellevue, WA (US); Anthony T. Chor, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/824,029

(22) Filed: Nov. 28, 2017

(65) Prior Publication Data
US 2018/0084067 A1      Mar. 22, 2018

Related U.S. Application Data (63) Continuation of application No. 15/074,288, filed on Mar. 18, 2016, now Pat. No. 9,832,253, which is a
(Continued)

(51) Int. Cl.
*H04L 29/06*      (2006.01)
*H04L 29/08*      (2006.01)
(Continued)

(52) U.S. Cl.
CPC ........ *H04L 67/22* (2013.01); *G06F 16/24578* (2019.01); *G06F 16/9574* (2019.01);
(Continued)

(58) Field of Classification Search
CPC . G06F 17/3053; G06F 17/30902; H04L 67/02
(Continued)

(56) References Cited

U.S. PATENT DOCUMENTS 5,247,674 A    9/1993 Kogure
5,270,103 A    12/1993 Oliver et al.
(Continued)

FOREIGN PATENT DOCUMENTS

AU    2011101579 A4    2/2012
CN    1806258 A    7/2006
(Continued)

OTHER PUBLICATIONS

"Web Prefetching Techniques in Real Environments"—Perez et al, Department of Computer Science, Polytechnic University of Valencia, Mar. 2011 https://pdfs.semanticscholar.org/3ef4/4291eba8f5b767aadd5360043cb8ff373ff5.pdf (Year: 2011).*
(Continued)

*Primary Examiner* — Randy A Scott
(74) *Attorney, Agent, or Firm* — Workman Nydegger (57) ABSTRACT

Content pre-render and pre-fetch techniques are described. In one or more implementations, a likelihood is predicted of subsequent navigation to content associated with a network address based at least in part on monitored navigation performed by a computing device to one or more network addresses. A determination is then made whether to cause the computing device to pre-fetch and pre-render the content based at least in part on the prediction.

20 Claims, 8 Drawing Sheets

Related U.S. Application Data continuation of application No. 13/918,869, filed on Jun. 14, 2013, now Pat. No. 9,307,007.

(51) Int. Cl.
*G06F 17/30* (2006.01)
*G06N 5/04* (2006.01)
*G06N 7/00* (2006.01)
*G06F 16/957* (2019.01)
*G06F 16/2457* (2019.01)

(52) U.S. Cl.
CPC ............... *G06N 5/04* (2013.01); *G06N 7/005* (2013.01); *H04L 67/02* (2013.01)

(58) Field of Classification Search
USPC ........ 709/213, 219, 226, 227, 228; 707/706, 707/734, 737; 715/205, 234, 244
See application file for complete search history.

(56) References Cited

U.S. PATENT DOCUMENTS

| | | | |
|---|---|---|---|
| 5,564,002 | A | 10/1996 | Brown |
| 5,588,071 | A | 12/1996 | Schultz |
| 5,590,327 | A | 12/1996 | Biliris et al. |
| 5,696,675 | A | 12/1997 | Nakamura et al. |
| 5,729,704 | A | 3/1998 | Stone et al. |
| 5,781,195 | A | 7/1998 | Marvin |
| 5,784,699 | A | 7/1998 | McMahon et al. |
| 5,801,717 | A | 9/1998 | Engstrom et al. |
| 5,841,439 | A | 11/1998 | Pose et al. |
| 5,844,569 | A | 12/1998 | Eisler et al. |
| 5,870,769 | A | 2/1999 | Freund |
| 5,918,239 | A | 6/1999 | Allen et al. |
| 5,986,670 | A | 11/1999 | Dries et al. |
| 6,067,093 | A | 5/2000 | Grau et al. |
| 6,091,422 | A | 7/2000 | Ouaknine et al. |
| 6,182,133 | B1 | 1/2001 | Horvitz |
| 6,191,796 | B1 | 2/2001 | Tarr |
| 6,226,017 | B1 | 5/2001 | Goossen et al. |
| 6,236,410 | B1 | 5/2001 | Politis et al. |
| 6,249,289 | B1 | 6/2001 | Arnaud et al. |
| 6,330,003 | B1 | 12/2001 | Curtis et al. |
| 6,335,765 | B1 | 1/2002 | Daly et al. |
| 6,344,855 | B1 | 2/2002 | Fisher et al. |
| 6,411,302 | B1 | 6/2002 | Chiraz |
| 6,426,750 | B1 | 7/2002 | Hoppe |
| 6,501,474 | B1 | 12/2002 | Thomson et al. |
| 6,504,545 | B1 | 1/2003 | Browne et al. |
| 6,525,722 | B1 | 2/2003 | Deering |
| 6,809,745 | B1 | 10/2004 | O'Donnell et al. |
| 6,850,967 | B1 | 2/2005 | Spencer et al. |
| 6,864,886 | B1 | 3/2005 | Cavallaro et al. |
| 6,900,813 | B1 | 5/2005 | Stefanidis |
| 7,031,517 | B1 | 4/2006 | Le et al. |
| 7,102,635 | B2 | 9/2006 | Shih et al. |
| 7,113,935 | B2 * | 9/2006 | Saxena ............... G06F 16/9574 707/748 |
| 7,127,592 | B2 | 10/2006 | Abraham et al. |
| 7,130,890 | B1 | 10/2006 | Kumar et al. |
| 7,133,054 | B2 | 11/2006 | Aguera y Arcas |
| 7,307,631 | B2 | 12/2007 | Robart |
| 7,342,580 | B1 | 3/2008 | Peterson |
| 7,400,322 | B1 | 7/2008 | Urbach |
| 7,511,718 | B2 | 3/2009 | Subramanian et al. |
| 7,594,093 | B1 | 9/2009 | Kancherla |
| 7,667,715 | B2 | 2/2010 | MacInnis et al. |
| 7,738,688 | B2 | 6/2010 | Eichhorn et al. |
| 7,792,876 | B2 | 9/2010 | Easwar |
| 7,877,708 | B2 | 1/2011 | Zinn et al. |
| 7,941,758 | B2 | 5/2011 | Tremblay |
| 8,010,624 | B2 | 8/2011 | Scott et al. |
| 8,161,087 | B2 | 4/2012 | Latzina |
| 8,255,818 | B2 | 8/2012 | Bales et al. |
| 8,284,211 | B2 | 10/2012 | Darsa et al. |
| 8,306,399 | B1 | 11/2012 | Trottier et al. |
| 8,307,300 | B1 | 11/2012 | Fisher et al. |
| 8,314,809 | B1 | 11/2012 | Grabowski et al. |
| 8,341,245 | B1 * | 12/2012 | Roskind ............... H04L 67/2847 709/219 |
| 8,386,480 | B2 | 2/2013 | Castro et al. |
| 8,438,474 | B1 | 5/2013 | Lloyd |
| 8,549,421 | B2 | 10/2013 | Gohda et al. |
| 8,744,988 | B1 * | 6/2014 | Hamon ............... G06F 17/2235 706/45 |
| 9,307,007 | B2 | 4/2016 | Kapadia et al. |
| 9,384,711 | B2 | 7/2016 | Ergan et al. |
| 2002/0005854 | A1 | 1/2002 | Deering et al. |
| 2002/0005891 | A1 | 1/2002 | Wilson et al. |
| 2002/0015042 | A1 | 2/2002 | Robotham et al. |
| 2002/0049819 | A1 | 4/2002 | Matsuda et al. |
| 2002/0075327 | A1 | 6/2002 | Stall |
| 2002/0089547 | A1 | 7/2002 | Huapaya |
| 2002/0094125 | A1 | 7/2002 | Guo |
| 2002/0110057 | A1 | 8/2002 | Kadlec et al. |
| 2002/0163530 | A1 | 11/2002 | Takakura et al. |
| 2002/0163542 | A1 | 11/2002 | Costea et al. |
| 2003/0001847 | A1 | 1/2003 | Doyle et al. |
| 2003/0020719 | A1 | 1/2003 | Abgrall |
| 2003/0091232 | A1 | 5/2003 | Kalevo et al. |
| 2003/0189597 | A1 | 10/2003 | Anderson et al. |
| 2003/0227460 | A1 | 12/2003 | Schinnerer |
| 2003/0229605 | A1 | 12/2003 | Herrera et al. |
| 2004/0003188 | A1 | 1/2004 | Rao |
| 2004/0008212 | A1 | 1/2004 | O'Neill |
| 2004/0107380 | A1 | 6/2004 | Vollschwitz |
| 2004/0150647 | A1 | 8/2004 | Aleksic et al. |
| 2004/0160446 | A1 | 8/2004 | Gosalia et al. |
| 2004/0160449 | A1 | 8/2004 | Gossalia et al. |
| 2004/0162930 | A1 | 8/2004 | Forin et al. |
| 2004/0189668 | A1 | 9/2004 | Beda et al. |
| 2004/0212619 | A1 | 10/2004 | Saito et al. |
| 2005/0035980 | A1 | 2/2005 | Lonsing |
| 2005/0050297 | A1 | 3/2005 | Essick et al. |
| 2005/0071777 | A1 | 3/2005 | Roessler et al. |
| 2005/0088447 | A1 | 4/2005 | Hanggie et al. |
| 2005/0140683 | A1 | 6/2005 | Collins et al. |
| 2005/0172098 | A1 | 8/2005 | Worley |
| 2005/0190178 | A1 | 9/2005 | Taghavi et al. |
| 2005/0235124 | A1 | 10/2005 | Pomaranski et al. |
| 2005/0283566 | A1 | 12/2005 | Callaghan |
| 2006/0107229 | A1 | 5/2006 | Matthews et al. |
| 2006/0112254 | A1 | 5/2006 | Piper et al. |
| 2006/0200778 | A1 | 9/2006 | Gritzman et al. |
| 2006/0248469 | A1 | 11/2006 | Czerwinski et al. |
| 2006/0290705 | A1 | 12/2006 | White et al. |
| 2007/0013708 | A1 | 1/2007 | Barcklay et al. |
| 2007/0018992 | A1 | 1/2007 | Wong |
| 2007/0035543 | A1 | 2/2007 | David |
| 2007/0040788 | A1 | 2/2007 | Saha |
| 2007/0047760 | A1 | 3/2007 | Sharma et al. |
| 2007/0088768 | A1 | 4/2007 | Passerini et al. |
| 2007/0091098 | A1 | 4/2007 | Zhang et al. |
| 2007/0101066 | A1 | 5/2007 | Al Sukhni et al. |
| 2007/0113194 | A1 | 5/2007 | Bales et al. |
| 2007/0133900 | A1 | 6/2007 | Nielsen et al. |
| 2007/0154087 | A1 | 7/2007 | Cho et al. |
| 2007/0291044 | A1 | 12/2007 | Xu et al. |
| 2008/0001962 | A1 | 1/2008 | Lefebvre et al. |
| 2008/0040568 | A1 | 2/2008 | Bhattacharya |
| 2008/0071559 | A1 | 3/2008 | Arrasvuori |
| 2008/0100613 | A1 | 5/2008 | Woo et al. |
| 2008/0136840 | A1 | 6/2008 | Chang et al. |
| 2008/0140981 | A1 | 6/2008 | Kim |
| 2008/0155623 | A1 | 6/2008 | Ota |
| 2008/0165268 | A1 | 7/2008 | Takahashi et al. |
| 2008/0166033 | A1 | 7/2008 | Bueno et al. |
| 2008/0198168 | A1 | 8/2008 | Jiao et al. |
| 2008/0222242 | A1 | 9/2008 | Weiss et al. |
| 2008/0235292 | A1 | 9/2008 | Janin et al. |
| 2008/0238928 | A1 | 10/2008 | Poddar et al. |
| 2008/0244458 | A1 | 10/2008 | Brugiolo et al. |
| 2008/0285074 | A1 | 11/2008 | Wilson |

(56) References Cited

U.S. PATENT DOCUMENTS

| | | |
|---|---|---|
| 2008/0291201 A1 | 11/2008 | Lafon |
| 2008/0298689 A1 | 12/2008 | Ashbrook et al. |
| 2009/0102842 A1 | 4/2009 | Li |
| 2009/0129635 A1 | 5/2009 | Abe |
| 2009/0141895 A1 | 6/2009 | Anderson et al. |
| 2009/0172331 A1 | 7/2009 | Vembu et al. |
| 2009/0208110 A1 | 8/2009 | Hoppe et al. |
| 2009/0210482 A1 | 8/2009 | Wynn et al. |
| 2009/0213081 A1 | 8/2009 | Case, Jr. |
| 2009/0213112 A1 | 8/2009 | Zhu et al. |
| 2009/0262122 A1 | 10/2009 | Darsa et al. |
| 2009/0284537 A1 | 11/2009 | Hong et al. |
| 2009/0315900 A1 | 12/2009 | Ungureanu et al. |
| 2009/0322764 A1 | 12/2009 | Saini et al. |
| 2010/0011316 A1 | 1/2010 | Sar et al. |
| 2010/0042945 A1 | 2/2010 | Bauchot et al. |
| 2010/0073379 A1 | 3/2010 | Berger et al. |
| 2010/0079480 A1 | 4/2010 | Murtagh |
| 2010/0162126 A1 | 6/2010 | Donaldson et al. |
| 2010/0169310 A1 | 7/2010 | Latzina |
| 2010/0207957 A1 | 8/2010 | Taneja et al. |
| 2010/0277504 A1 | 11/2010 | Song |
| 2010/0278442 A1 | 11/2010 | Parsons et al. |
| 2010/0281402 A1 | 11/2010 | Staikos et al. |
| 2010/0289806 A1 | 11/2010 | Lao et al. |
| 2010/0293504 A1 | 11/2010 | Hachiya |
| 2010/0309205 A1 | 12/2010 | Novasad |
| 2010/0313125 A1 | 12/2010 | Fleizach et al. |
| 2010/0315319 A1 | 12/2010 | Cok et al. |
| 2010/0321377 A1 | 12/2010 | Gay et al. |
| 2010/0325589 A1 | 12/2010 | Ofek et al. |
| 2011/0022984 A1 | 1/2011 | van der Meulen et al. |
| 2011/0043553 A1 | 2/2011 | Brown Elliott et al. |
| 2011/0069881 A1 | 3/2011 | Kitago |
| 2011/0072391 A1 | 3/2011 | Hanggie et al. |
| 2011/0078624 A1 | 3/2011 | Missig et al. |
| 2011/0102440 A1 | 5/2011 | Yuen et al. |
| 2011/0138314 A1 | 6/2011 | Mir et al. |
| 2011/0141123 A1 | 6/2011 | Kumar et al. |
| 2011/0154248 A1 | 6/2011 | Tsuruoka |
| 2011/0173569 A1 | 7/2011 | Howes et al. |
| 2011/0199377 A1 | 8/2011 | Jang et al. |
| 2011/0252299 A1 | 10/2011 | Lloyd et al. |
| 2011/0267370 A1 | 11/2011 | Tanaka |
| 2011/0304699 A1 | 12/2011 | Ito et al. |
| 2012/0042252 A1 | 2/2012 | Neerudu et al. |
| 2012/0050313 A1 | 3/2012 | Gruber |
| 2012/0081368 A1 | 4/2012 | Park et al. |
| 2012/0092335 A1 | 4/2012 | Kim et al. |
| 2012/0102034 A1 | 4/2012 | Kim et al. |
| 2012/0115600 A1 | 5/2012 | Dietrich et al. |
| 2012/0151308 A1 | 6/2012 | Falkenberg et al. |
| 2012/0188342 A1 | 7/2012 | Gervautz et al. |
| 2012/0213435 A1 | 8/2012 | Donovan et al. |
| 2012/0218381 A1 | 8/2012 | Uro et al. |
| 2012/0229464 A1 | 9/2012 | Fishwick |
| 2012/0235933 A1 | 9/2012 | Yamamura et al. |
| 2012/0249741 A1 | 10/2012 | Maciocci et al. |
| 2012/0251003 A1 | 10/2012 | Perbet et al. |
| 2012/0254780 A1 | 10/2012 | Mouton et al. |
| 2012/0271805 A1* | 10/2012 | Holenstein ............ G06F 16/955 707/706 |
| 2012/0324043 A1 | 12/2012 | Burkard et al. |
| 2013/0007260 A1 | 1/2013 | Jain et al. |
| 2013/0007590 A1 | 1/2013 | Rivera et al. |
| 2013/0019159 A1 | 1/2013 | Civelli et al. |
| 2013/0021262 A1 | 1/2013 | Chen |
| 2013/0050249 A1 | 2/2013 | Grabowski et al. |
| 2013/0073509 A1 | 3/2013 | Burkard et al. |
| 2013/0073670 A1 | 3/2013 | Das et al. |
| 2013/0074080 A1 | 3/2013 | Jimenez |
| 2013/0093750 A1 | 4/2013 | Cornell et al. |
| 2013/0122934 A1* | 5/2013 | Branch .................. H04W 4/21 455/456.3 |
| 2013/0208012 A1 | 8/2013 | Ergan et al. |
| 2013/0305159 A1* | 11/2013 | Kim .................. G06F 17/30876 715/738 |
| 2013/0321453 A1 | 12/2013 | Fink et al. |
| 2013/0321454 A1 | 12/2013 | Fink et al. |
| 2013/0321455 A1 | 12/2013 | Fink et al. |
| 2013/0321471 A1 | 12/2013 | Fink et al. |
| 2015/0193395 A1* | 7/2015 | Nicolaou ............ G06F 16/9574 707/726 |

FOREIGN PATENT DOCUMENTS

| | | |
|---|---|---|
| CN | 101278540 A | 10/2008 |
| CN | 102737037 A | 10/2012 |
| CN | 102792244 A | 11/2012 |
| WO | 9522104 A1 | 8/1995 |
| WO | 2011037966 A2 | 3/2011 |

OTHER PUBLICATIONS

Lentell, Gour, "Amazon Silk and Cloud Browsers", Retrieved from <<http://www.binu.com/2011/09/amazon-silk-and-cloud-browsers/>>, Sep. 30, 2011, 3 Pages.

Liu, et al., "Caching and Prefetching for Web Content Distribution", In Proceedings of the Computing in Science & Engineering, vol. 6, Issue 4, Jun. 21, 2004, 6 Pages.

Miles, et al., "The Forger's Win32 API Programming Tutorial—A Simple Window", Retrieved From <<https://web.archive.org/web/20100211130846/http://www.winprog.org/tutorial/simple_window.html>>, Mar. 24, 2015, 5 Pages.

Moreland, et al., "Sort-Last Parallel Rendering for Viewing Extremely Large Data Sets on Tile Displays", In Proceedings of the IEEE Symposium on Parallel and Large-Data Visualization and Graphics, Oct. 22, 2001, pp. 85-93.

"International Search Report and Written Opinion Issued in PCT Application No. PCT/US2013/023354", dated May 16, 2013, 10 Pages.

"International Search Report & Written Opinion Issued in PCT Application No. PCT/US2013/041485", dated Oct. 11, 2013, 16 Pages.

"International Preliminary Report on Patentability Issued in PCT Application No. PCT/US2013/061010", dated Oct. 26, 2015, 8 Pages.

"International Search Report & Written Opinion Issued in PCT Application No. PCT/US2013/061010", dated Aug. 20, 2014, 11 Pages.

"Second Written Opinion Issued in PCT Application No. PCT/US2013/061010", dated Jun. 25, 2015, 7 Pages.

"Compositing Window Manager", Retrieved From <<http://en.wikipedia.org/w/index.php?title=Compositing_window_manager&oldid=492324820>>, Jul. 1, 2014, 11 Pages.

"Copying Render Options", Retrieved from <http://download.autodesk.com/global/docs/softimage2013/en_us/userguide/index.html?url=files/renderoptions_managing_CopyingRenderOptions.htm,topicNumber=d28e375988>, Feb. 9, 2012, 3 Pages.

"Desktop Window Manager", Retrieved From <<http://en.wikipedia.org/wiki/windex.php?title=Desktop_window_manager&oldid=425547889#External_links>>, Jun. 3, 2014, 5 Pages.

"File Explorer", Retrieved From <<http://en.wikipedia.org/w/index.php?title=File_Explorer&oldid=425043676>>, Apr. 20, 2011, Apr. 20, 2011, 13 Pages.

"ID Composition Virtual Surface: Trim method", Retrieved From <<http://msdn.microsoft.com/en-us/library/windows/desktop/hh449137(v=vs.85).aspx>>, Jun. 15, 2012, 2 Pages.

"Open GL Programming Guide", The Official Guide to Learning Open, GL, Versions 3.0 and 3.1. Addison-Wesley, Jul. 2009, 1019 Pages.

"Polygonal Modeling", Retrieved From <<http://web.archive.org/web/20120303001434/http://en.wikipedia.org/wiki/Polygonal_modeling>>, Mar. 3, 2012, 6 Pages.

"Shading OpenGL Shaders", Retrieved From <<http://www.sidefx.com/docs/houdini9.5/shade/opengl>>, Feb. 9, 2012, 7 Pages.

(56) References Cited

OTHER PUBLICATIONS

"Spaces (software)", Retrieved From <<https://en.wikipedia.org/w/index.php?title=Spaces_%28software%29&oldid=467135782>>, Jun. 2, 2014, 3 Pages.

"Viewing Virtual Surface Aids Reclassification", Retrieved From <<http://www.microimages.com/documentation/TechGuides/77LASsurfReclas.pdf>>, Oct. 2010, 2 Pages.

"Working with Rendering Contexts", Retrieved From <<https://developer.apple.com/library/mac/documentation/GraphicsImaging/Conceptual/OpenGL-MacProgGuide/opengl_contexts/opengl_contexts.html>>, Jan. 2010, 9 Pages.

"Final Office Action Issued in U.S. Appl. No. 13/397,299", dated May 13, 2015, 19 Pages.

"Non-Final Office Action Issued in U.S. Appl. No. 13/397,299", dated Nov. 6, 2014, 28 Pages.

"Non-Final Office Action Issued in U.S. Appl. No. 13/397,299", dated May 14, 2014, 20 Pages.

"Notice of Allowance Issued in U.S. Appl. No. 13/397,299", dated Jan. 20, 2016, 5 Pages.

Shade, et al., "Tiling Layered Depth Images", Retrieved From <<http://grail.cs.washington.edu/projects/ldi/data/TilingLDIs.pdf>>, Jan. 2000, 10 Pages.

"Final Office Action Issued in U.S. Appl. No. 13/485,805", dated Mar. 24, 2015, 35 Pages.

"Final Office Action Issued in U.S. Appl. No. 13/485,805", dated Jun. 26, 2014, 30 Pages.

"Non-Final Office Action Issued in U.S. Appl. No. 13/485,805", dated Dec. 19, 2013, 28 Pages.

"Non-Final Office Action Issued in U.S. Appl. No. 13/485,805", dated Nov. 6, 2014, 34 Pages.

"Final Office Action Issued in U.S. Appl. No. 13/485,815", dated Nov. 19, 2014, 24 Pages.

"Final Office Action Issued in U.S. Appl. No. 13/485,815", dated Jun. 11, 2014, 18 Pages.

"Non-Final Office Action Issued in U.S. Appl. No. 13/485,815", dated Sep. 23, 2014, 20 Pages.

"Non-Final Office Action Issued in U.S. Appl. No. 13/485,815", dated Dec. 18, 2013, 16 Pages.

"Non-Final Office Action Issued in U.S. Appl. No. 13/485,815", dated Apr. 23, 2015, 32 Pages.

"Final Office Action Issued in U.S. Appl. No. 13/485,825", dated Jun. 12, 2014, 19 Pages.

"Final Office Action Issued in U.S. Appl. No. 13/485,825", dated Jan. 26, 2015, 35 Pages.

"Non-Final Office Action Issued in U.S. Appl. No. 13/485,825", dated Oct. 2, 2014, 29 Pages.

"Non-Final Office Action Issued in U.S. Appl. No. 13/485,825", dated Jan. 30, 2014, 18 Pages.

"Final Office Action Issued in U.S. Appl. No. 13/485,832", dated Apr. 22, 2014, 20 Pages.

"Final Office Action Issued in U.S. Appl. No. 13/485,832", dated Aug. 26, 2014, 24 Pages.

"Final Office Action Issued in U.S. Appl. No. 13/485,832", dated Apr. 3, 2015, 43 Pages.

"Non-Final Office Action Issued in U.S. Appl. No. 13/485,832", dated Jun. 2, 2014, 20 Pages.

"Non-Final Office Action Issued in U.S. Appl. No. 13/485,832", dated Dec. 19, 2013, 21 Pages.

"Non-Final Office Action Issued in U.S. Appl. No. 13/485,832", dated Nov. 28, 2014, 29 Pages.

"Final Office Action Issued in U.S. Appl. No. 13/918,869", dated Jul. 14, 2015, 9 Pages.

"Non-Final Office Action Issued in U.S. Appl. No. 13/918,869", dated Mar. 30, 2015, 13 Pages.

"Notice of Allowance Issued in U.S. Appl. No. 13/918,869", dated Nov. 24, 2015, 12 Pages.

"Supplementary Search Report Issued in European Patent Application No. 13749288.0", dated Jun. 19, 2015, 8 Pages.

"Office Action Issued in European Patent Application No. 13771325.1", dated Feb. 26, 2018, 7 Pages.

"Final Office Action Issued in U.S. Appl. No. 15/074,288", dated Feb. 27, 2017, 10 Pages.

"Non Final Office Action Issued in U.S. Appl. No. 15/074,288", dated Sep. 30, 2016, 13 Pages.

"Notice of Allowance Issued in U.S. Appl. No. 15/074,288", dated Jul. 25, 2017, 14 Pages.

"First Office Action Issued in Chinese Patent Application No. 201310211477.X", dated May 5, 2015, 16 Pages.

"Office Action Issued in Chinese Patent Application No. 201380009644.0", dated Jun. 14, 2016, 8 Pages.

"Office Action Issued in Chinese Patent Application No. 201380077446.8", dated Mar. 5, 2018, 8 Pages. (W/o English Translation).

Corbet, et al., "Linux Device Drivers", In Chapter 8—Allocating Memory, Third Edition, In Book: Linux Device Drivers, O'Reilly Media Inc, Jan. 2005, 23 Pages.

Ivan, "Google Adds Voice Search, Visual Search and Results Prerendering", Retrieved From <<http://www.mt-soft.com.ar/2011/06/14/google-adds-voice-search-visual-search-and-results-prerendering/?utm_source=feedburner&utm_medium=feed&utm_campaign=Feed%3A+mtsoftblog+%28MT-Soft%29>>, Jun. 14, 2011, 6 Pages.

Junkie, Gui, "Tabbed Browsing—Why Close the Application on Closing the Last Tab?", Retrieved From <<http://ux.stackexchange.com/questions/10598/tabbed-browsing-why-close-the-application-on-closing-the-last-tab>>, Aug. 28, 2011, 3 Pages.

Krishnan, et al., "DNS Prefetching and It's Privacy Implications: When Good Things Go Bad", In Proceedings of the 3rd Usenix Conference on Large-Scale Exploits and Emergent Threats: Botnets, Spyware, Worms, and More, Apr. 2010, 9 Pages.

"Second Office Action Issued in Chinese Patent Application No. 201380077446.8", dated Oct. 15, 2018, 11 Pages.

"Third Office Action Issued in Chinese Patent Application No. 201380077446.8", dated Apr. 12, 2019, 9 Pages.

\* cited by examiner

502
Collect data from a plurality of computing devices, that describes navigation performed by respective computing devices to interact with a plurality of network addresses

504
Generate navigation data based on monitored navigation performed by a plurality of different computing devices to access a plurality of different network addresses

506
Expose the navigation data for use by a computing device to predict subsequent navigation by a computing device to one or more network addresses

CONTENT PRE-RENDER AND PRE-FETCH TECHNIQUES

CROSS-REFERENCE TO RELATED APPLICATIONS

This application is a continuation of U.S. patent application Ser. No. 15/074,288 filed on Mar. 18, 2016, entitled "CONTENT PRE-RENDER AND PRE-FETCH TECHNIQUES," which issued as U.S. Pat. No. 9,832,253 on Nov. 28, 2017, which is a continuation of U.S. patent application Ser. No. 13/918,869 filed on Jun. 14, 2013, entitled "CONTENT PRE-RENDER AND PRE-FETCH TECHNIQUES," which issued as U.S. Pat. No. 9,307,007 on Apr. 5, 2016, the entirety of each of which are incorporated herein by reference.

BACKGROUND

Users may spend a significant amount of time navigating between network addresses by using a computing device, such as to "surf the web." For example, users may navigate between a variety of different webpages provided via a variety of different websites to view and interact with content of interest.

To draw users, the content available from the network addresses continues to provide an ever increasing richness for viewing by users. This may include use of rich graphics, dynamic scripts, animations, audio, streaming content, and so on. However, the richness of this content may cause delays in navigation to access these network addresses, which may decrease a user's experience and therefore counteract the purpose of a service provider in making this content available to the users.

BRIEF SUMMARY

Content pre-render and pre-fetch techniques are described. In one or more implementations, a likelihood is predicted of subsequent navigation to content associated with a network address based at least in part on monitored navigation performed by a computing device to one or more network addresses. A determination is then made whether to cause the computing device to pre-fetch and pre-render the content based at least in part on the prediction.

In one or more implementations, a system includes one or more modules implemented at least partially in hardware. The one or more modules are configured to perform operations that include computing a confidence score indicating a relative likelihood of subsequent navigation to content associated with a network address based at least in part on monitored navigation performed by a computing device to one or more network addresses. Responsive to a determination that the confidence score meets a pre-render threshold for the subsequent navigation, the content associated with the network address is caused to be pre-fetched and pre-rendered by the computing device. Responsive to a determination that the confidence score meets a pre-fetch threshold for the subsequent navigation but does not meet the pre-render threshold for the subsequent navigation, the content associated with the network address is caused to be pre-fetched but not pre-rendered by the computing device.

In one or more implementations, a system includes one or more modules implemented at least partially in hardware. The one or more modules are configured to perform operations that include generating navigation data based on monitored navigation performed by a plurality of different computing devices to access a plurality of different network addresses and exposing the navigation data for use by a computing device to predict subsequent navigation by the computing device to one or more network addresses, at least part of the predicted navigation not involving a link included in a current content item accessed by the computing device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

A user experience involved in navigation between network addresses (e.g., webpages) may be improved by pre-rendering content located at network addresses associated with likely user navigation. For example, to pre-render a web page, a browser or other web-enabled application may download resources associated with the content of the page and then construct that page. Therefore, when the user navigates to the pre-rendered webpage, the page may be displayed without waiting for the content to be obtained and rendered as these operations have already occurred.

However, pre-rendering of content may be considered a relatively expensive operation in terms of computing device resource usage. Therefore, techniques are described herein in which a likelihood that a user will cause a computing device to navigate to a particular network address may be used as a basis to determine whether to pre-render content available via a network address. For example, a confidence score may be computed as part of a prediction for navigation to a particular website. This computation may be based on a variety of factors, such use of navigation data that describes a sequence of navigations made by other users in a similar situation. Therefore, this group browsing history may be used to determine a likely destination as well as a confidence score detailing how likely that navigation is to occur.

If the confidence score indicates a relatively high likelihood (e.g., through comparison with a pre-render threshold), the content may be pre-fetched and pre-rendered by the computing device. In another instance, the confidence score may indicate that although the navigation is likely, the navigation is not likely enough to justify pre-rendering of the content, such as to meet a pre-fetch threshold but not the pre-render threshold. In such an instance, the content may be pre-fetched but not pre-rendered, e.g., the content is downloaded. In this way, the computing device may leverage these relative likelihoods to support increased functionality and efficiency, such as to support use of a "flip ahead" function in a browser. A variety of other examples are also contemplated, further discussion of which may be found in relation to the following sections.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

Figure 1:
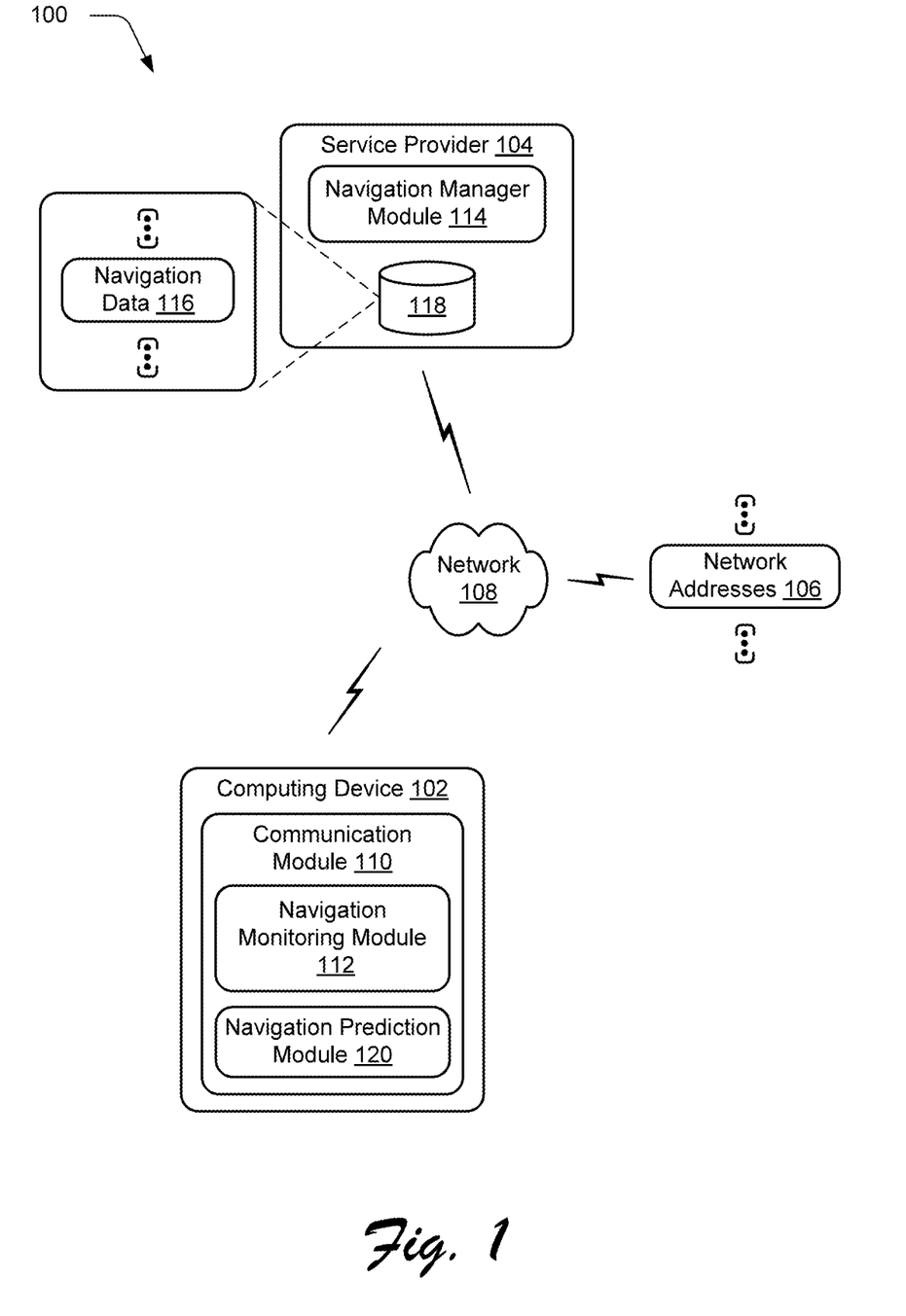
FIG. 1 is an illustration of an environment in an example implementation that is operable to perform content pre-render and pre-fetch techniques.

FIG. 1 is an illustration of an environment 100 in an example implementation that is operable to employ techniques described herein. The illustrated environment 100 includes a computing device 102, a service provider 104, and one or more network addresses 106, each of which are communicatively coupled, one to another, via a network 108. The computing device 102 as well as computing devices that may implement the service provider 104 and network addresses 106 may be configured in a variety of ways.

For example, a computing device may be configured as a computer that is capable of communicating over the network 108, such as a desktop computer, a mobile station, an entertainment appliance, a set-top box communicatively coupled to a display device, a wireless phone, a game console, and so forth. Thus, the computing device 102 may range from full resource devices with substantial memory and processor resources (e.g., personal computers, game consoles) to a low-resource device with limited memory and/or processing resources (e.g., traditional set-top boxes, hand-held game consoles). Additionally, a computing device may be representative of a plurality of different devices, such as multiple servers utilized by a business to perform operations such as by the service provider 104 or network addresses 106, a remote control and set-top box combination, an image capture device and a game console configured to capture gestures, and so on.

Although the network 108 is illustrated as the Internet, the network may assume a wide variety of configurations. For example, the network 108 may include a wide area network (WAN), a local area network (LAN), a wireless network, a public telephone network, an intranet, and so on. Further, although a single network 108 is shown, the network 108 may be representative of a plurality of networks.

The computing device 102 is further illustrated as including a communication module 110. The communication module 110 is representative of functionality that is configured to interact with the network address 106 and/or the service provider 104 via the network 108. As such, the communication module 110 may be configured in a variety of ways. For example, the communication module 110 may be configured as a browser that is configured to "surf the web." The communication module 110 may also be configured as part of a network-enabled application (e.g., a web-enabled app), a plug-in module, part of an operating system, and so on. Thus, network access functionality represented by the communication module 110 may be implemented in a variety of different ways.

The communication module 110 is also illustrated as including a navigation monitoring module 112. The navigation monitoring module 112 is representative of functionality to monitor navigation of the communication module 110 (and thus the computing device 102) to interact with the different network addresses 106, e.g., to access content via the network addresses 106. This may include generating data that describes a sequence of interaction with the network addresses 106, a context regarding those interactions, and so on.

The navigation monitoring module 112, for instance, may monitor a navigation sequence that involves selection of a favorite network address (e.g., web site) in a browser, selection of a link within a webpage provided by that website, navigation to another website that involves typing in a network address 106, and so on. Further, this monitored navigation may include data describing a context of the navigation, such as a time of day, day of week, month, how the access was performed (e.g., selection of a link, typing of an address, search result), and so forth.

Data obtained from this monitored interaction may then be provided to a navigation manager module 114 of the service provider 104. The navigation manager module 114 is representative of functionality to obtain and manage data obtained from a plurality of computing devices that describes monitored navigation. This data may be leveraged in a variety of ways, such as a "group history" that describes navigation by the plurality of computing devices. This group history may then be used to support a variety of different functionality, such as to predict "to where" subsequent navigation that is performed by the computing device 102 will occur.

The navigation manager module 114, for instance, may be configured to generate navigation data 116 that is maintained in storage 118 associated with the service provider 104. This navigation data 116 may then be communicated to the computing device 102 for use by a navigation prediction module 120. The navigation prediction module 120 is representative of functionality to predict likely subsequent navigation by a computing device 102 and thus may leverage the navigation data 116 to make this prediction, further discussion of which may be found in the discussion of FIG. 2.

Further, as a part of making the prediction, the navigation prediction module 120 may compute an amount of confidence in the prediction, i.e., a confidence score. Thus, a determination may be made as to which actions are to be performed based on the amount of confidence in the prediction, further discussion of which may be found in relation to FIG. 3.

Figure 2:
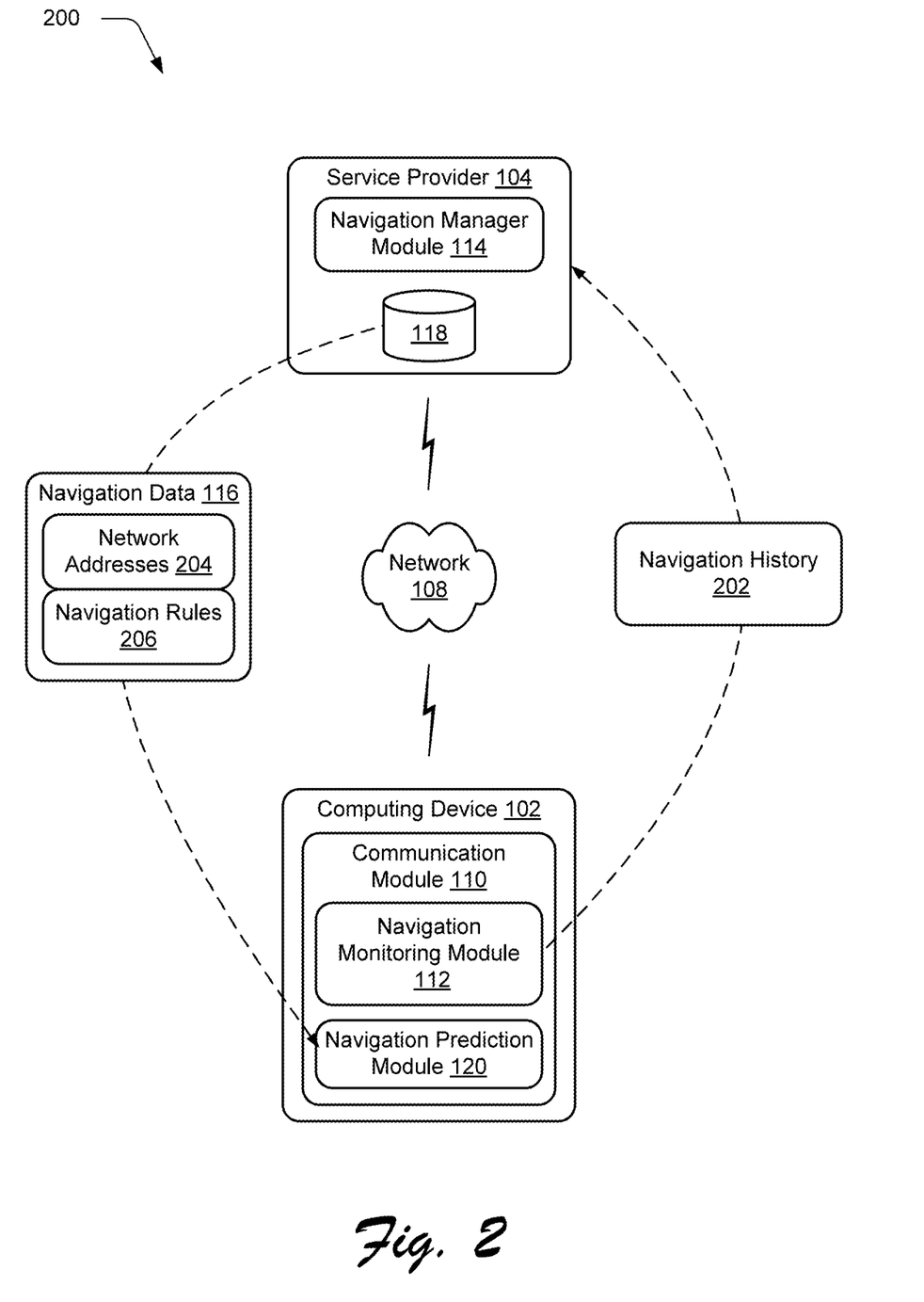
FIG. 2 depicts an example of a system in which interaction between the computing device and the service provider is shown.

FIG. 2 depicts an example of a system 200 in which interaction between the computing device 102 and the service provider 104 is shown. As stated above, the navigation monitoring module 112 may be configured to monitor navigation performed by the communication module 110. This data may then be provided as a navigation history 202 to a navigation manager module 114 of the service provider 104. For example, a user of the computing device 102 may "opt in" to sharing of this information with the service provider 104 as part of the prediction functionality described herein. The navigation history 202 may then be provided, which may describe network addresses accessed by the computing device 102 as well as a context of that access as described above.

The navigation manager module 114 may then collect this data in storage 118 from a plurality of computing devices in a similar manner and use this information as a group browsing history to generate network data 116. The network data 116, for instance, may include one or more sequences of network addresses 204.

These sequences may then be used as part of a prediction made by the navigation prediction module 120 to predict a likely next destination for navigation of the communication module 110. For example, the sequences may involve navigation within a website, such as selection of a series of links. Therefore, when navigation of the communication module 110 is monitored as performing similar navigation this sequence may be leveraged to predict a likely next link to be selected by a user. In another example, this navigation may include manual entry of network addresses, selection from a favorites list, and so on, such as to navigate between webpages. Even in this instance, this sequence may be leveraged to predict a likely next destination as part of subsequent navigation to be performed by the communication module 110.

The navigation data 116 may also include one or more navigation rules 206 that may be applied by the navigation prediction module 120 as part of the prediction. A navigation rule 206, for instance, may specify that a link "next page," if included in content currently accessed by the communication module 110, has a relatively high likelihood of selection by a user. Likewise, other characteristics of currently accessed content may be leveraged by the navigation prediction module 120 as part of making the prediction. The navigation rules 206 may also be applied to a variety of other criteria monitored by the navigation monitoring module, e.g., that a selection of a link "3" is likely after selection of links "1" and "2", and so on. Thus, in this example the navigation data 116 is provided to the computing device 102 for local usage by the navigation prediction module 120 in making the prediction. Other examples are also contemplated, such as through use by the service provider 104 to predict navigation that is likely to occur by the computing device.

Figure 3:
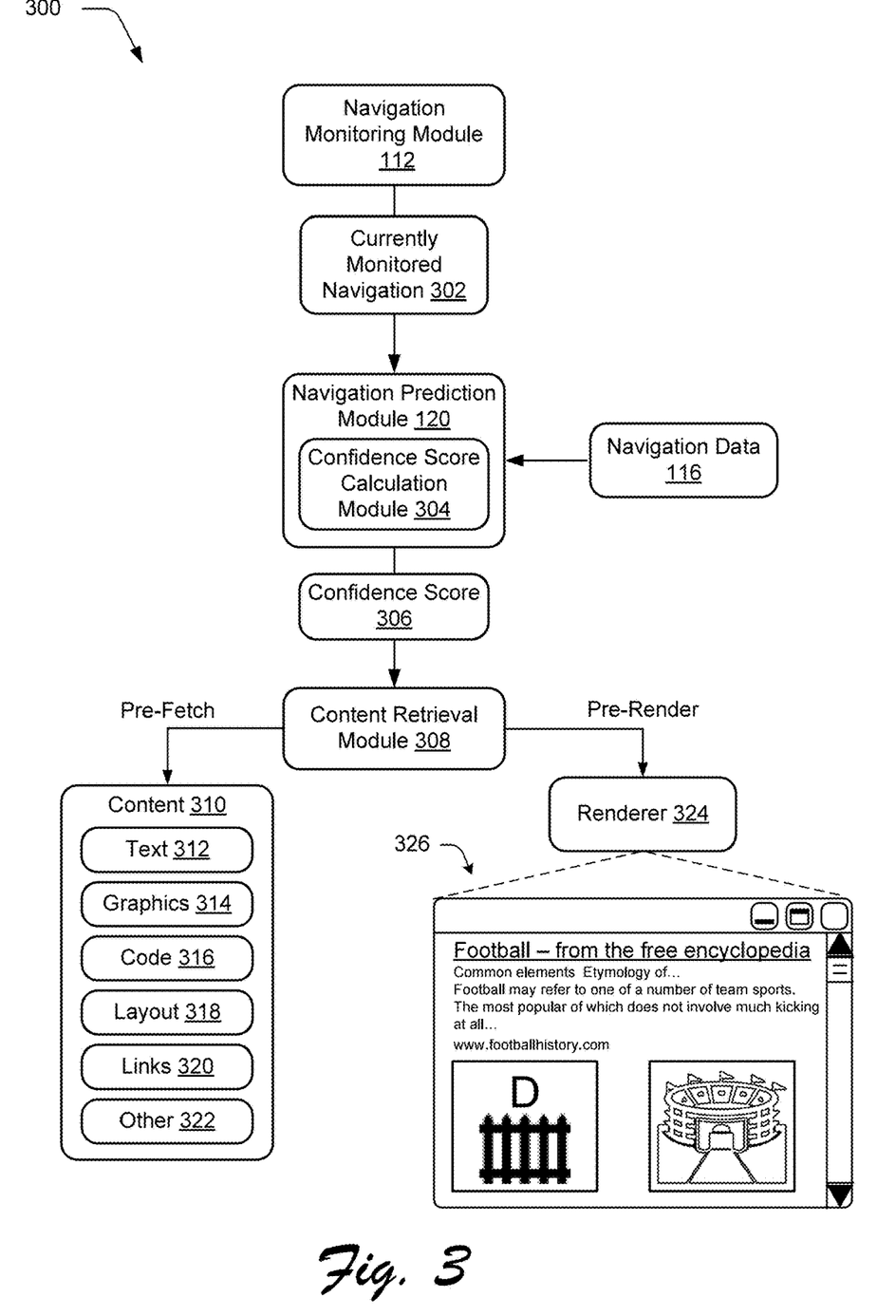
FIG. 3 depicts a system in an example implementation in which a confidence score is leveraged to determine whether to pre-render and/or pre-fetch content from a network address.

FIG. 3 depicts a system 300 in an example implementation in which a confidence score is leveraged to determine whether the pre-render and/or pre-fetch content from a network address. As illustrated, a navigation monitoring module 112 provides data describing currently monitored navigation 302 performed by the communication module 110 of the computing device 102. As before, this data may describe a currently accessed network address, content obtained via the network address, past navigation, and other characteristics that describe a context of this access.

The navigation prediction module 120 may then employ this data describing currently monitored navigation 302 along with navigation data 116 received from the service provider 102 to make a prediction regarding subsequent navigation. As before, this may be based on a sequence of navigation, characteristics of content, and so on. In one embodiment, such prediction may be made based on a characteristic of content that includes determining a number or quantity of links including with the current network address (e.g., website) the user is viewing. In this way, the content of the current network address itself can be used in the prediction to account for a characteristic of the current network address that may be a predictor of future navigation. For example, if the current network address has a certain number or quantity of links to a first network address and a lesser number or quantity of links to a second network address, the prediction may favor navigation to the first network address that includes the larger number or quantity of links within the current network address. Further, the navigation prediction module 120 may employ a confidence score calculation module 304 that is representative of functionality to compute a confidence score 306 regarding the prediction. The confidence score 306 may thus be thought of as a computation of how likely the predicted outcome will occur, i.e., subsequent navigation to a particular network address. They may be utilized in a variety of ways. For example, the confidence score calculation may be based on a number or quantity of links including with a current website that the user is viewing that points to a particular network address.

For example a content retrieval module 308 may obtain the confidence score 306. If the confidence score meets a pre-fetch threshold, content 310 associated with the prediction may be pre-fetched, e.g., obtained via the network. The content 310, for instance, may include text 312, graphics 314, code 316, data describing a layout 318, links 320, and other 322 data. Therefore, this obtained data may be "ready for rendering" but is not in a rendered state that is suitable for display without further processing.

If the confidence score also meets a pre-render threshold, the content 310 obtained via the pre-fetch may be passed to a renderer 324 for processing into a rendered form 326 that is ready for display by a display device. For example, the renderer 324 may parse the layout 318, render vector graphics 314, execute code 316 (e.g., dynamic runtime code), and so on. This processing, for instance, may be performed as part of a graphics processing unit of the computing device 102, although other functionality may also be leveraged as part of this rendering.

Thus, the confidence score may be tied to different amounts of computing device resource usage to improve efficiency of the computing device. As previously described, for instance, pre-rendering of content may be considered a relatively expensive operation in terms of computing device resource usage. Therefore, a pre-rendering threshold may be tied to a relatively high degree of confidence in a prediction before pre-rendering of content is permitted.

However, a pre-fetch of content 310 is not as computationally expensive as a pre-render and therefore a pre-fetch threshold may be employed that is lower than the pre-render threshold to determine whether the content 310 is to be pre-fetched. Thus, in some instances the content may not be fetched at all (e.g., when a confidence score 306 is below a pre-fetch threshold), the content may be pre-fetched but not pre-rendered (e.g., when the confidence score 206 is between the pre-fetch and pre-render thresholds), or the content may be pre-fetched and pre-rendered (e.g., when the confidence score 306 is above a pre-render threshold). Pre-rendering of content may be performed in a variety of ways, an example of which is described as follows and shown in a corresponding figure.

Figure 4:
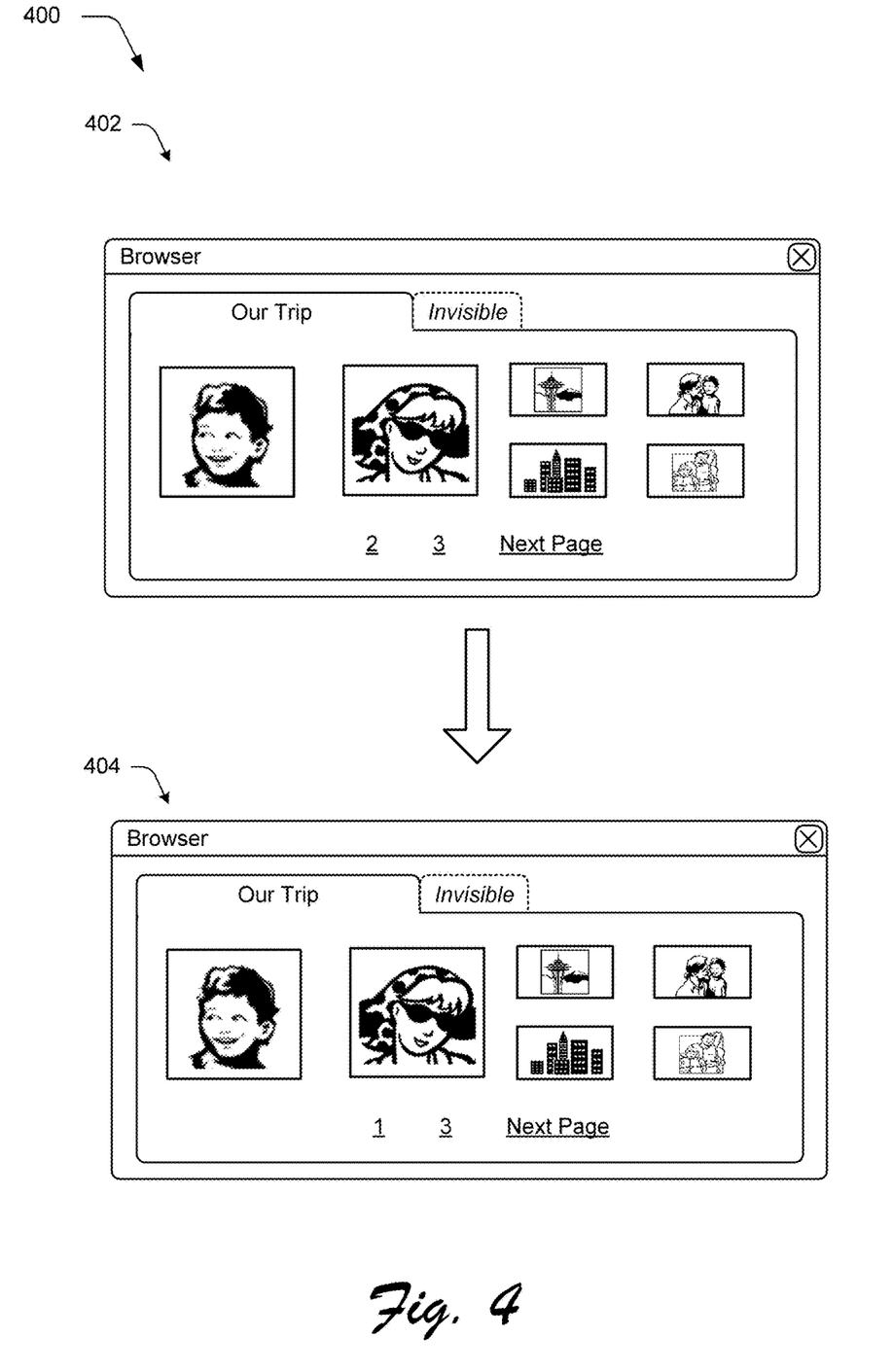
FIG. 4 depicts an example of use of pre-rendered content in a browser of a computing device.

FIG. 4 depicts an example 400 of use of pre-rendered content in a browser of a computing device 102. This example is illustrated using first and second stages 402, 404. At the first stage 402, a tabbed user interface of a browser is shown as outputting a webpage involving pictures of a trip. This webpage is configured as a first webpage of a series of webpages of the trip.

A prediction is made by the navigation prediction module 120 that a second webpage in the series is likely to be the next destination in the user's navigation. This prediction may be performed in a variety of ways as previously described, which in this instance may be based on identification of particular links in the webpage (e.g., next page), identification that multiple links point to a same network address (e.g., "2" and "next page"), and so on.

Accordingly, an "invisible tab" may be allocated which although shown in phantom in the figure is not viewable by a user. Content of the predicted web page may then be rendered to this invisible tab, which may include running dynamic runtime code, rendering graphics, obtaining additional content for other network addresses (e.g., ads), and so on.

Therefore, when a use provide an input to navigate to the predicted content, content in the invisible tab may be used to replace the previous content as shown in the second stage 404. These techniques may continue, e.g., to pre-render a third webpage in the sequence. In this way, a user's subsequent navigation to network addresses may be performed with increased efficiency yet still conserve resources of the computing device. This may be leveraged to support a variety of different functionality, such as to "flip ahead" to additional webpages that are predicted by the computing device. Further discussion of these and other techniques may be found in relation to the following procedures.

Example Procedures

The following discussion describes content pre-render and pre-fetch techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-4.

Figure 5:
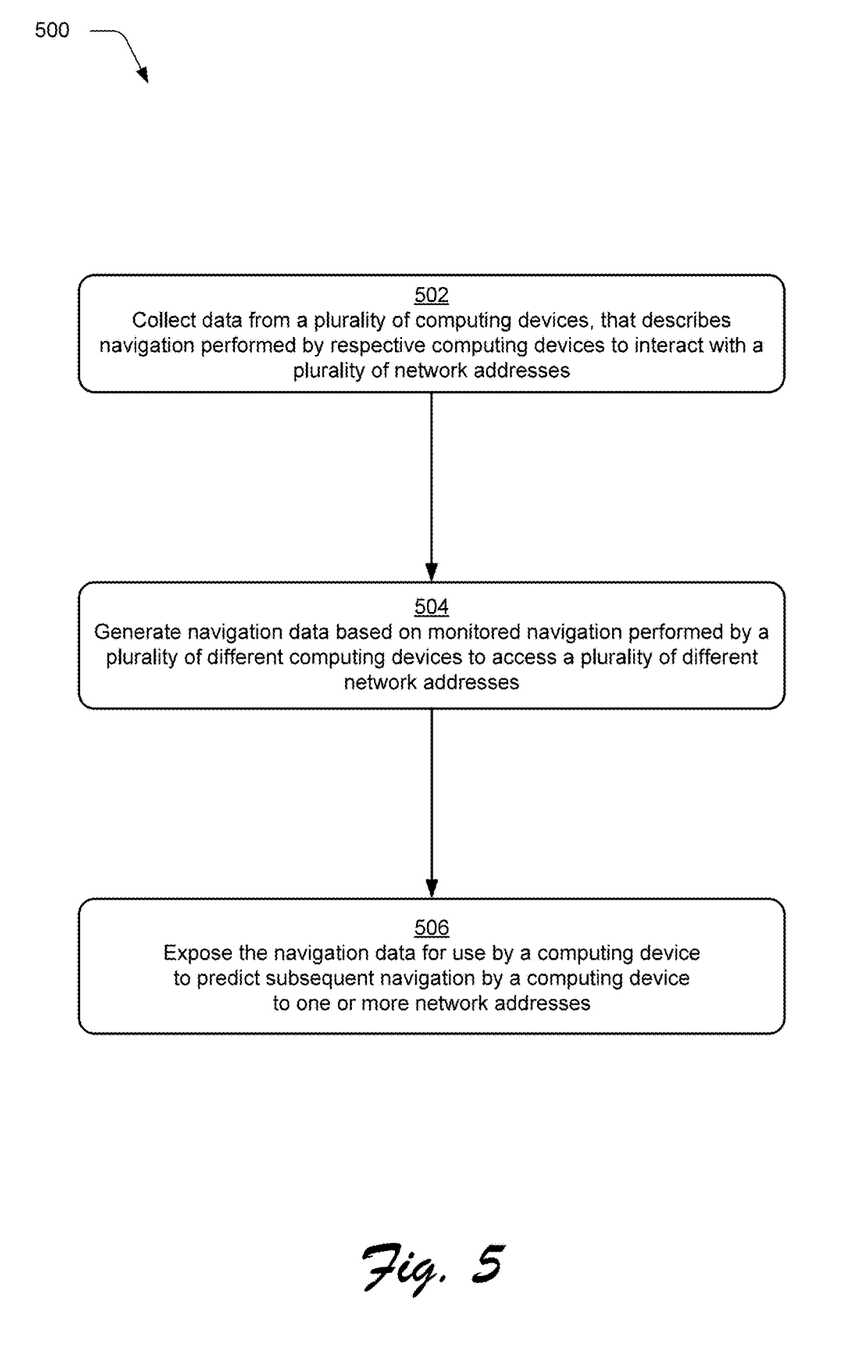
FIG. 5 is a flow diagram depicting a procedure in an example implementation in which data is collected from a plurality of computing devices and used to generate navigation data that is exposed to predict subsequent navigation.

FIG. 5 depicts a procedure 500 in an example implementation in which data is collected from a plurality of computing devices and used to generate navigation data that is exposed to predict subsequent navigation. Data is collected from a plurality of computing devices, the data describing navigation performed by respective computing devices to interact with a plurality of network addresses (block 502). Users, for instance, may desire to "opt in" to "flip ahead" features of a browser that support navigation to a next likely webpage through use of a gesture. As a result, data that describes navigation performed by the users may be provided to help predict navigation that may be performed by that user as well as other users.

Navigation data is generated based on the monitored navigation performed by a plurality of different computing devices to access a plurality of different network addresses (block 504). The navigation data 116, for instance, may include network addresses 204, navigation rules 206, and so on.

The navigation data is exposed for use by a computing device to predict subsequent navigation by a computing device to one or more network addresses (block 506). The service provider 104, for instance, may expose the navigation data 116 for use by a computing device 102 is predicting subsequent navigation. Other examples are also contemplated, such as for use by the service provider 104 itself in making the prediction. An example of one technique that may be used to make a prediction may be found below.

Figure 6:
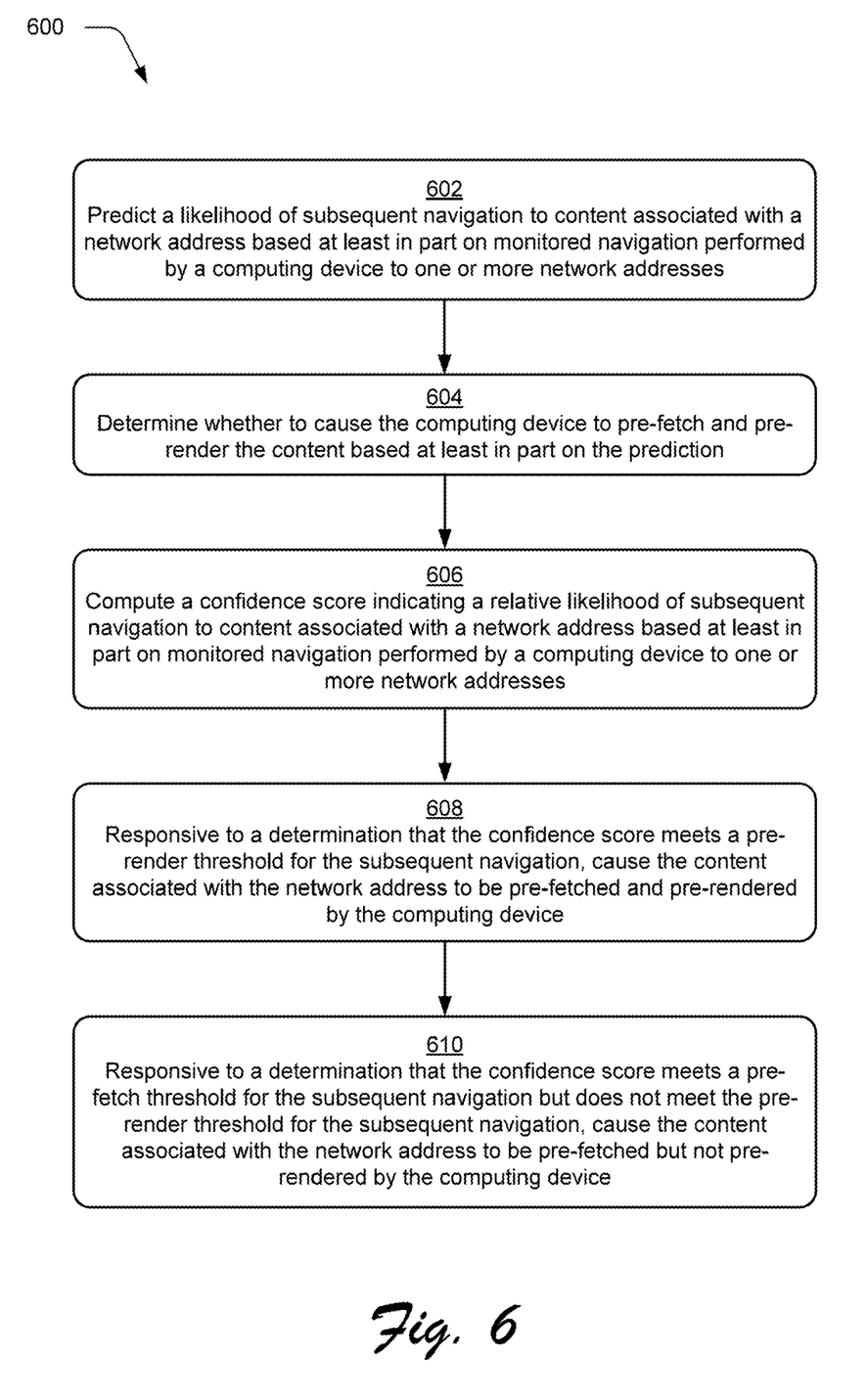
FIG. 6 is a flow diagram depicting a procedure in an example implementation in which a prediction of a likelihood of subsequent navigation to particular network addresses is utilized to determine whether to pre-fetch and pre-render content available via the particular network address.

FIG. 6 depicts a procedure 600 in an example implementation in which a prediction of a likelihood of subsequent navigation to particular network addresses is utilized to determine whether to pre-fetch and pre-render content available via the particular network address. A likelihood is predicted of subsequent navigation to content associated with a network address based at least in part on monitored navigation performed by a computing device to one or more network addresses (block 602). A navigation prediction module 120, for instance, may leverage navigation data 116 to make a prediction as previously described as to where a communication module 110 is likely to navigate.

A determination is then made whether to cause the computing device to pre-fetch and pre-render the content based at least in part on the prediction (block 604). For example, a confidence score may be computed that indicates a relative likelihood of subsequent navigation to content associated with a network address based at least in part on monitored navigation performed by a computing device to one or more network addresses (block 606).

Responsive to a determination that the confidence score meets a pre-render threshold for the subsequent navigation, the content associated with the network address is caused to be pre-fetched and pre-rendered by the computing device (block 608). Thus, a relatively strong confidence score associated with a prediction may be used as a basis to determine whether to pre-render the content, which as previously described may be computationally expensive.

Responsive to a determination that the confidence score meets a pre-fetch threshold for the subsequent navigation but does not meet the pre-render threshold for the subsequent navigation, the content associated with the network address is caused to be pre-fetched but not pre-rendered by the computing device (block 610). Continuing with the previous example, a determination may be made that although a prediction is likely, it is not likely enough based on the confidence score to assume the expense of pre-rendering the content. Therefore, in this instance the content may be pre-fetched but not pre-rendered, with rendering waiting until a user indicates a desire to navigate to that network address. A variety of other examples are also contemplated as previously described.

Example System and Device

Figure 7:
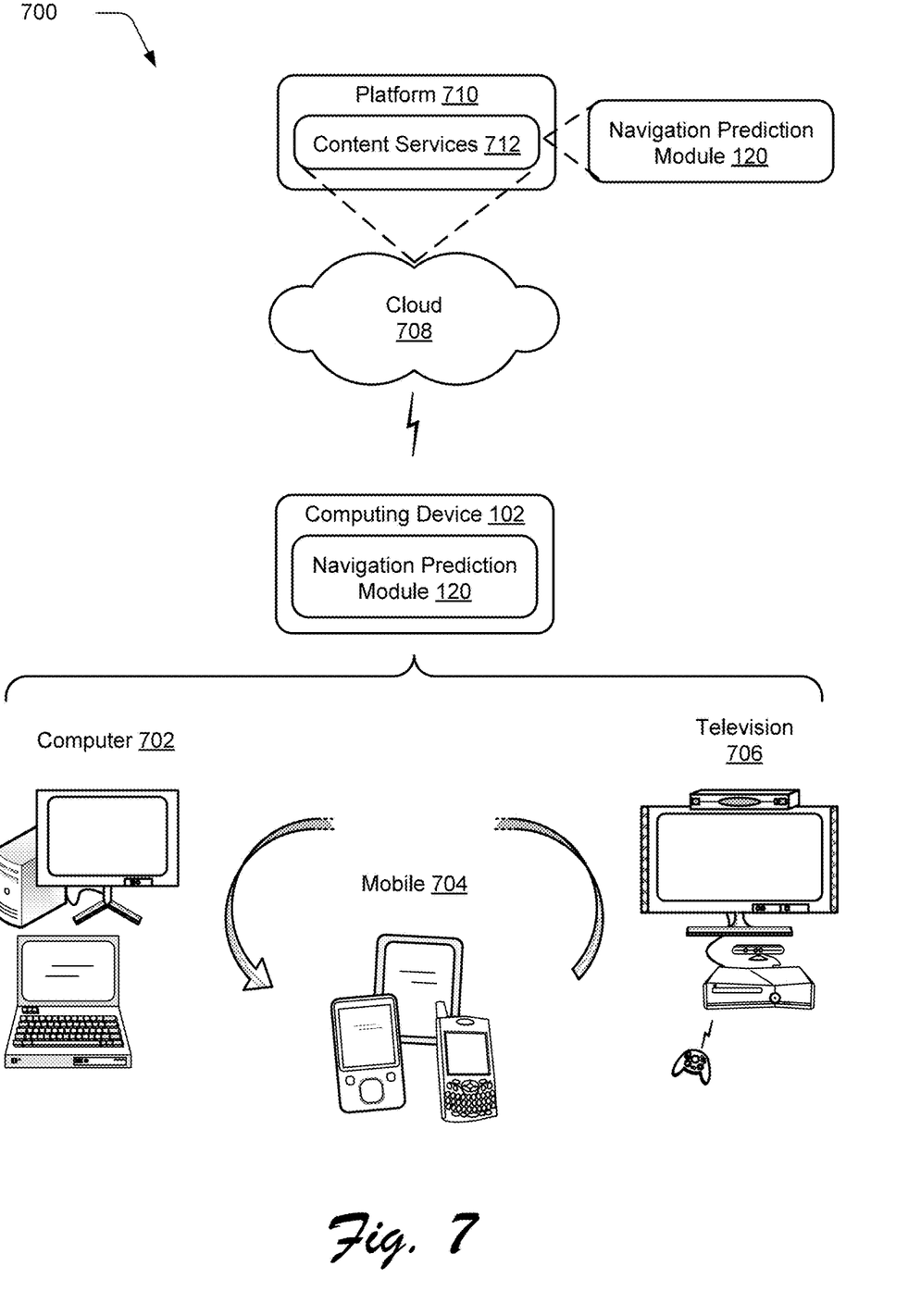
FIG. 7 illustrates an example system that includes the computing device as described with reference to FIG. 1.

FIG. 7 illustrates an example system 700 that includes the computing device 102 as described with reference to FIG. 1. The example system 700 enables ubiquitous environments for a seamless user experience when running applications on a personal computer (PC), a television device, and/or a mobile device. This environment may be configured to incorporate the techniques previously described, as shown by include of the navigation prediction modules 120. Services and applications run substantially similar in all three environments for a common user experience when transitioning from one device to the next while utilizing an application, playing a video game, watching a video, and so on.

In the example system 700, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link. In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 102 may assume a variety of different configurations, such as for computer 702, mobile 704, and television 706 uses. Each of these configurations includes devices that may have generally different constructs and capabilities, and thus the computing device 102 may be configured according to one or more of the different device classes. For instance, the computing device 102 may be implemented as the computer 702 class of a device that includes a personal computer, desktop computer, a multi-screen computer, laptop computer, netbook, and so on.

The computing device 102 may also be implemented as the mobile 704 class of device that includes mobile devices, such as a mobile phone, portable music player, portable gaming device, a tablet computer, a multi-screen computer, and so on. The computing device 102 may also be implemented as the television 706 class of device that includes devices having or connected to generally larger screens in casual viewing environments. These devices include televisions, set-top boxes, gaming consoles, and so on. The techniques described herein may be supported by these various configurations of the computing device 102 and are not limited to the specific examples the techniques described herein.

The cloud 708 includes and/or is representative of a platform 710 for content services 712. The platform 710 abstracts underlying functionality of hardware (e.g., servers) and software resources of the cloud 708. The content services 712 may include applications and/or data that can be utilized while computer processing is executed on servers that are remote from the computing device 102. Content services 712 can be provided as a service over the Internet and/or through a subscriber network, such as a cellular or Wi-Fi network.

The platform 710 may abstract resources and functions to connect the computing device 102 with other computing devices. The platform 710 may also serve to abstract scaling of resources to provide a corresponding level of scale to encountered demand for the content services 712 that are implemented via the platform 710. Accordingly, in an interconnected device embodiment, implementation of functionality of the functionality described herein may be distributed throughout the system 700. For example, the functionality may be implemented in part on the computing device 102 as well as via the platform 710 that abstracts the functionality of the cloud 708.

Figure 8:
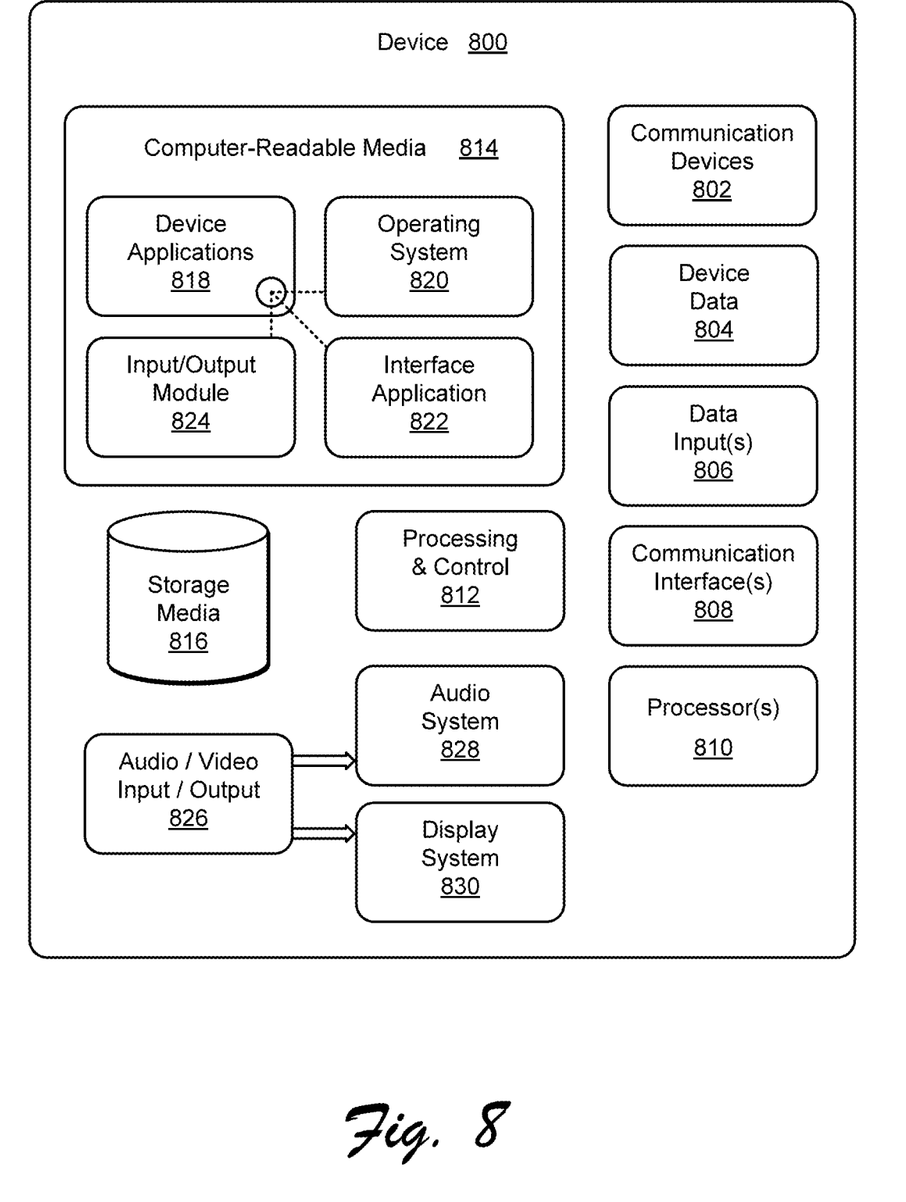
FIG. 8 illustrates various components of an example device that can be implemented as any type of computing device as described with reference to FIGS. 1-7 to implement embodiments of the techniques described herein.

FIG. 8 illustrates various components of an example device 800 that can be implemented as any type of computing device as described with reference to FIGS. 1, 2, and 7 to implement embodiments of the techniques described herein. Device 800 includes communication devices 802 that enable wired and/or wireless communication of device data 804 (e.g., received data, data that is being received, data scheduled for broadcast, data packets of the data, etc.). The device data 804 or other device content can include configuration settings of the device, media content stored on the device, and/or information associated with a user of the device. Media content stored on device 800 can include any type of audio, video, and/or image data. Device 800 includes one or more data inputs 806 via which any type of data, media content, and/or inputs can be received, such as user-selectable inputs, messages, music, television media content, recorded video content, and any other type of audio, video, and/or image data received from any content and/or data source.

Device 800 also includes communication interfaces 808 that can be implemented as any one or more of a serial and/or parallel interface, a wireless interface, any type of network interface, a modem, and as any other type of communication interface. The communication interfaces 808 provide a connection and/or communication links between device 800 and a communication network by which other electronic, computing, and communication devices communicate data with device 800.

Device 800 includes one or more processors 810 (e.g., any of microprocessors, controllers, and the like) which process various computer-executable instructions to control the operation of device 800 and to implement embodiments of the techniques described herein. Alternatively or in addition, device 800 can be implemented with any one or combination of hardware, firmware, or fixed logic circuitry that is implemented in connection with processing and control circuits which are generally identified at 812. Although not shown, device 800 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 800 also includes computer-readable media 814, such as one or more memory components, examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 800 can also include a mass storage media device 816.

Computer-readable media 814 provides data storage mechanisms to store the device data 804, as well as various device applications 818 and any other types of information and/or data related to operational aspects of device 800. For example, an operating system 820 can be maintained as a computer application with the computer-readable media 814 and executed on processors 810. The device applications 818 can include a device manager (e.g., a control application, software application, signal processing and control module, code that is native to a particular device, a hardware abstraction layer for a particular device, etc.). The device applications 818 also include any system components or modules to implement embodiments of the techniques described herein. In this example, the device applications 818 include an interface application 822 and an input/output module 824 (which may be the same or different as input/output module 114) that are shown as software modules and/or computer applications. The input/output module 824 is representative of software that is used to provide an interface with a device configured to capture inputs, such as a touchscreen, track pad, camera, microphone, and so on. Alternatively or in addition, the interface application 822 and the input/output module 824 can be implemented as hardware, software, firmware, or any combination thereof. Additionally, the input/output module 824 may be configured to support multiple input devices, such as separate devices to capture visual and audio inputs, respectively.

Device 800 also includes an audio and/or video input-output system 826 that provides audio data to an audio system 828 and/or provides video data to a display system 830. The audio system 828 and/or the display system 830 can include any devices that process, display, and/or otherwise render audio, video, and image data. Video signals and audio signals can be communicated from device 800 to an audio device and/or to a display device via an RF (radio frequency) link, S-video link, composite video link, component video link, DVI (digital video interface), analog audio connection, or other similar communication link. In an embodiment, the audio system 828 and/or the display system 830 are implemented as external components to device 800. Alternatively, the audio system 828 and/or the display system 830 are implemented as integrated components of example device 800.

Although the example implementations have been described in language specific to structural features and/or methodological acts, it is to be understood that the implementations defined in the appended claims is not necessarily limited to the specific features or acts described. Rather, the specific features and acts are disclosed as example forms of implementing the claimed features.

What is claimed is:

1. A computer system comprising:
one or more processors; and
one or more computer-readable hardware storage devices having stored thereon computer-executable instructions, the computer-executable instructions being executable by the one or more processors to cause the computer system to:
collect data corresponding to navigation sequences performed by a user;
use the collected data to identify one or more navigation characteristics of the user, the one or more navigation characteristics describing a context of at least some of the user's navigation sequences; and
predict a next network address that the user will navigate to and pre-fetch a particular website associated with the next network address, wherein predicting the next network address is based on at least:
the one or more navigation characteristics of the user; and
a determined number of links that are displayed within in a current website that the user is viewing and that all point to the same next network address for the particular website.

2. The computer system of claim 1, wherein the context includes a time of day that the user navigation between network addresses.

3. The computer system of claim 1, wherein the context includes details regarding how the user accesses network addresses.

4. The computer system of claim 3, wherein the details regarding how the user accesses the network addresses includes whether the user selected a link, whether the user typed an address, or whether the user performed a search.

5. The computer system of claim 1, wherein predicting the next network address is also based on a confidence score.

6. The computer system of claim 5, wherein the confidence score is based on the number of links included within a current website that the user is viewing.

7. The computer system of claim 1, wherein the user previously opted in to allowing the data to be collected with respect to the user's navigation sequences.

8. The computer system of claim 1, wherein the user's navigation sequences involve website navigations, the website navigations including selections of a series of links.

9. The computer system of claim 1, wherein the plurality of other users whose information is included in the group browsing history previously opted in to allowing their information to be included in the group browsing history.

10. The computer system of claim 1, further comprising:
obtaining access to a group browsing history including information corresponding to a plurality of navigation sequences performed by a plurality of other users, wherein the group browsing history includes network addresses that the plurality of other users navigated to.

11. The computer system of claim 10, wherein the group browsing history also includes one or more navigation rules that the plurality of other users followed when navigating to the network addresses.

12. The computer system of claim 1, wherein the information used when predicting the next network address is also used to generate a confidence score such that both the information and the confidence score are used when predicting the next network address.

13. The computer system of claim 12, wherein pre-fetching the website occurs only when the confidence score is determined to satisfy a threshold value.

14. One or more hardware storage devices having stored thereon computer-executable instructions, the computer-executable instructions being executable by one or more processors of a computer system to cause the computer system to:
collect data corresponding to navigation sequences performed by a user;
use the collected data to identify one or more navigation characteristics of the user, the one or more navigation characteristics describing a context of at least some of the user's navigation sequences; and
predict a next network address that the user will navigate to and pre-fetch a particular website associated with the next network address, wherein predicting the next network address is based on at least:
the one or more navigation characteristics of the user; and
a determined number of links that are displayed within in a current website that the user is viewing and that all point to the same next network address for the particular website.

15. The one or more hardware storage devices of claim 14, wherein the context includes (1) a time of day that the user navigates between network addresses and (2) details regarding how the user accesses the network addresses.

16. The one or more hardware storage devices of claim 14, wherein both the user and a plurality of other users previously opted in to having an association with a group browsing history.

17. A method that is implemented by one or more processors of a computer system, the method comprising:
   collecting data corresponding to navigation sequences performed by a user;
   using the collected data to identify one or more navigation characteristics of the user, the one or more navigation characteristics describing a context of at least some of the user's navigation sequences; and
   predicting a next network address that the user will navigate to and pre-fetch a particular website associated with the next network address, wherein predicting the next network address is based on at least:
   the one or more navigation characteristics of the user; and
   a determined number of links that are displayed within in a current website that the user is viewing and that all point to the same next network address for the particular website.

18. The method of claim 17, wherein the group browsing history includes (1) network addresses that the plurality of other users navigated to and (2) one or more navigation rules that the plurality of other users followed when navigating to the network addresses.

19. The method of claim 17, wherein the context includes details regarding how the user accesses network addresses.

20. The method of claim 19, wherein the details regarding how the user accesses the network addresses includes whether the user selected a link, whether the user typed an address, or whether the user performed a search.

* * * * *